(12) United States Patent
Barnes et al.

(10) Patent No.: US 8,596,884 B2
(45) Date of Patent: Dec. 3, 2013

(54) OPTICAL FIBER MECHANICAL SPLICE CONNECTOR SYSTEMS AND METHODS OF COUPLING OPTICAL FIBERS

(75) Inventors: Brandon A. Barnes, Ft. Worth, TX (US); Michael de Jong, Colleyville, TX (US); Greg J. Scherer, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 288 days.

(21) Appl. No.: 13/170,666

(22) Filed: Jun. 28, 2011

(65) Prior Publication Data

US 2013/0004130 A1 Jan. 3, 2013

(51) Int. Cl.
 *G02B 6/36* (2006.01)
(52) U.S. Cl.
 USPC .......... 385/81; 385/76; 385/77; 385/78; 385/95; 385/99
(58) Field of Classification Search
 USPC .......... 385/53, 76, 77, 78, 81, 95, 99
 See application file for complete search history.

(56) References Cited

U.S. PATENT DOCUMENTS

| | | | |
|---|---|---|---|
| 5,909,528 A | 6/1999 | Tamekuni et al. | 385/137 |
| 6,196,730 B1 * | 3/2001 | Hammar | 385/76 |
| 6,811,323 B2 * | 11/2004 | Murray et al. | 385/80 |
| 7,011,454 B2 | 3/2006 | Caveney et al. | 385/87 |
| 7,178,990 B2 | 2/2007 | Caveney et al. | 385/87 |
| 7,241,056 B1 | 7/2007 | Kuffel et al. | 385/60 |
| 7,280,733 B2 | 10/2007 | Larson et al. | 385/139 |
| 7,346,256 B2 | 3/2008 | Marrs et al. | 385/137 |
| 7,369,738 B2 | 5/2008 | Larson et al. | 385/134 |
| 7,568,845 B2 | 8/2009 | Caveney et al. | 385/87 |
| 7,654,748 B2 | 2/2010 | Kuffel et al. | 385/60 |
| 7,658,553 B2 | 2/2010 | Semmler et al. | 385/98 |
| 7,708,476 B2 | 5/2010 | Liu | 385/98 |
| 7,722,262 B2 | 5/2010 | Caveney et al. | 385/78 |
| 7,742,670 B2 | 6/2010 | Benjamin et al. | 385/125 |
| 7,775,726 B2 | 8/2010 | Pepin et al. | 385/78 |
| 7,806,600 B2 | 10/2010 | Marrs et al. | 385/81 |
| 2009/0310918 A1 | 12/2009 | Milette et al. | 385/83 |
| 2009/0317037 A1 | 12/2009 | Milette et al. | 385/83 |
| 2010/0046892 A1 | 2/2010 | Milette et al. | 385/83 |
| 2010/0129034 A1 | 5/2010 | Kuffel et al. | 385/81 |
| 2010/0183265 A1 | 7/2010 | Barnes et al. | 385/77 |
| 2010/0220962 A1 | 9/2010 | Caveney et al. | 385/78 |

* cited by examiner

*Primary Examiner* — Jennifer Doan (57) ABSTRACT

An optical fiber mechanical splice connector system that couples with a field fiber includes a connector body comprising a ferrule receiving portion, a pellet receiving portion and a support portion between the ferrule receiving portion and pellet receiving portion. The pellet receiving portion includes one or more engagement fingers connected at a first end to the support portion and extending away from the ferrule receiving portion to a second, free end adjacent a pellet receiving opening of a pellet receiving cavity at the pellet receiving portion. A ferrule is connected to the connector body at the ferrule receiving portion. A stub fiber is captured within the ferrule. The stub fiber extends from the ferrule into a fiber receiving cavity provided within the connector body for connecting with the field fiber. A fiber carrying pellet carries the field fiber. Inserting the fiber carrying pellet through the pellet receiving opening resiliently deflects the one or more engagement fingers thereby enlarging the pellet receiving opening such that the fiber carrying pellet is received by the pellet receiving cavity of the connector body.

15 Claims, 10 Drawing Sheets

OPTICAL FIBER MECHANICAL SPLICE CONNECTOR SYSTEMS AND METHODS OF COUPLING OPTICAL FIBERS

TECHNICAL FIELD

The present specification generally relates to optical fiber mechanical splice connector systems and methods of coupling optical fibers.

BACKGROUND

Optical fibers are widely used in a variety of applications, including the telecommunications industry in which optical fibers are employed in a number of telephone and data transmission applications. Due, at least in part to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home, or in some instances, directly to a desk or other work location.

With the ever increasing and varied use of optical fibers, it is apparent that efficient methods of coupling optical fibers, such as to other optical fibers, to a patch panel in a telephone central office or in an office building or to various remote terminals are required. However, in order to efficiently couple the signals transmitted by the respective optical fibers, a fiber optic connector must not significantly attenuate or alter the transmitted optical signals. In addition, the fiber optic connector must be relatively rugged and adapted to be connected and disconnected a number of times in order to accommodate changes in the optical fiber transmission path.

A wide variety of factory and field-installed fiber optic connectors are known. It is desired to have an optical fiber connector that is inexpensive to manufacture, easy to install and is capable of withstanding a wide range of environmental factors. In factory-installed connector designs, the connector is coupled with the end of one or more optical fibers during a factory assembly process. Factory installation of the fiber optic connectors onto the end of the optical fibers allows for increased accuracy in the assembly and construction of the connector and avoids the environmental and technical problems associated with field installation.

It is not always possible to factory install fiber optic connectors on the termination ends of optical fibers in every situation. For example, in widely-deployed networks, the optical fiber that terminates at the customer's premises, known as a field fiber, can vary in the desired length. Similarly, optical fiber installed within a structure may require optical fiber runs ranging from just a few feet to several hundred feet. Furthermore, the physical space limitations may not permit storage of excess fiber length that naturally results when installation is limited by a small number of available fiber lengths. With such varying lengths and the desire to minimize any excess slack on the ends of the optical fiber runs, it is simply not practical to install factory connectors on the fiber because of the uncertainty and variability in the length of field fiber.

Consequently, field-installable optical fiber connectors have been developed which can be coupled onto an end portion of an optical fiber in the field once the particular application and length of the optical fiber has been determined. Although alternative types of connectors are available, one of the most common forms of field-installable connectors is the mechanical splice connector. Mechanical splice connectors create a physical mating between the ends of mating optical fibers. Frequently, these mechanical splice connectors use an internal fiber contained within the connector to mate to the inserted field fiber within the connector. The internal fiber, commonly known as a "stub fiber" or "fiber stub", usually extends from about the end of a ferrule to approximately halfway along the length of the connector. This stub fiber is factorypolished at the ferrule end, enabling the ferrule and stub to be readily mated with another connector after installation of the connector. The other end of the stub fiber may be either cleaved or polished in the factory and provides a mating surface for engaging with an inserted field fiber.

One of the more important aspects of installing a mechanical splice connector is ensuring that the stub fiber and inserted field fiber are accurately aligned to ensure minimum insertion loss across the fiber-fiber interface. A number of mechanisms are known in the prior art to accomplish the task of accurately aligning the optical fibers. Alignment mechanisms in the art can ensure that the core of the fiber stub and the core of the field fiber are accurately aligned and the field fiber is then locked into position. After the optical fibers are aligned and the field fiber is locked into position, the alignment between the fiber stub and the inserted field fiber must be precisely maintained to provide a consistent, reliable connection.

SUMMARY

In one embodiment, an optical fiber mechanical splice connector system that couples with a field fiber includes a connector body comprising a ferrule receiving portion, a pellet receiving portion and a support portion between the ferrule receiving portion and pellet receiving portion. The pellet receiving portion includes one or more engagement fingers connected at a first end to the support portion and extending away from the ferrule receiving portion to a second, free end adjacent a pellet receiving opening of a pellet receiving cavity at the pellet receiving portion. A ferrule is connected to the connector body at the ferrule receiving portion. A stub fiber is captured within the ferrule. The stub fiber extends from the ferrule into a fiber receiving cavity provided within the connector body for connecting with the field fiber. A fiber carrying pellet carries the field fiber. Inserting the fiber carrying pellet through the pellet receiving opening resiliently deflects the one or more engagement fingers thereby enlarging the pellet receiving opening such that the fiber carrying pellet is received by the pellet receiving cavity of the connector body.

In another embodiment, a method of optically coupling a field fiber to a stub fiber using an optical fiber mechanical splice connector is provided. The method includes connecting the field fiber to a fiber receiving pellet. The fiber receiving pellet is connected to a pellet handler. The pellet handler includes a handler body with a fiber receiving opening extending therethrough defining an opening axis. A pellet engaging arm extends outwardly from the handler body in a direction of the opening axis. The pellet engaging arm includes connecting structure that engages cooperating connecting structure carried by the fiber carrying pellet to releasably connect the fiber carrying pellet to the pellet handler. The pellet handler with the fiber receiving pellet connected thereto is manipulated to connect the fiber receiving pellet to a connector body of the optical fiber mechanical splice connector such that the field fiber optically couples with the stub fiber.

In another embodiment, an optical fiber mechanical splice connector system that couples with a field fiber includes a connector body comprising a ferrule receiving portion, a pellet receiving portion and a support portion between the ferrule receiving portion and pellet receiving portion. The pellet receiving portion includes one or more engagement fingers connected at a first end to the support portion and extending away from the ferrule receiving portion to a second, free end adjacent a pellet receiving opening of a pellet receiving cavity at the pellet receiving portion. A ferrule is connected to the connector body at the ferrule receiving portion. A stub fiber is captured within the ferrule. The stub fiber extends from the ferrule into a fiber receiving cavity provided within the connector body for connecting with the field fiber. A fiber carrying pellet carries the field fiber. A pellet handler includes a handler body with a fiber receiving opening extending therethrough defining an opening axis and a pellet engaging arm extending outwardly from the handler body in a direction of the opening axis. The pellet engaging arm includes connecting structure that engages cooperating connecting structure carried by the fiber carrying pellet to releasably connect the fiber carrying pellet to the pellet handler.

Additional features and advantages of the claimed subject matter will be set forth in the detailed description which follows, and in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Embodiments described herein generally relate to optical fiber mechanical splice connector systems and methods of coupling optical fibers using such splice connector systems. The splice connector systems generally include an optical fiber mechanical splice connector that includes a connector body with a ferrule connected thereto. The ferrule may carry a stub fiber that can mate with another optic fiber at one end and a field fiber at an opposite end in the connector body. The field fiber is carried by a fiber carrying pellet that is connectable to the connector body, for example, using a pellet handler that can be used to manipulate the fiber carrying pellet. The pellet handler may generally be larger than the fiber carrying pellet, which can facilitate manual manipulation of the fiber carrying pellet when connecting the fiber carrying pellet to the connector body. The fiber carrying pellet aligns the field fiber with the stub fiber for optical coupling of the field fiber and stub fiber within the connector body.

Figure 1:
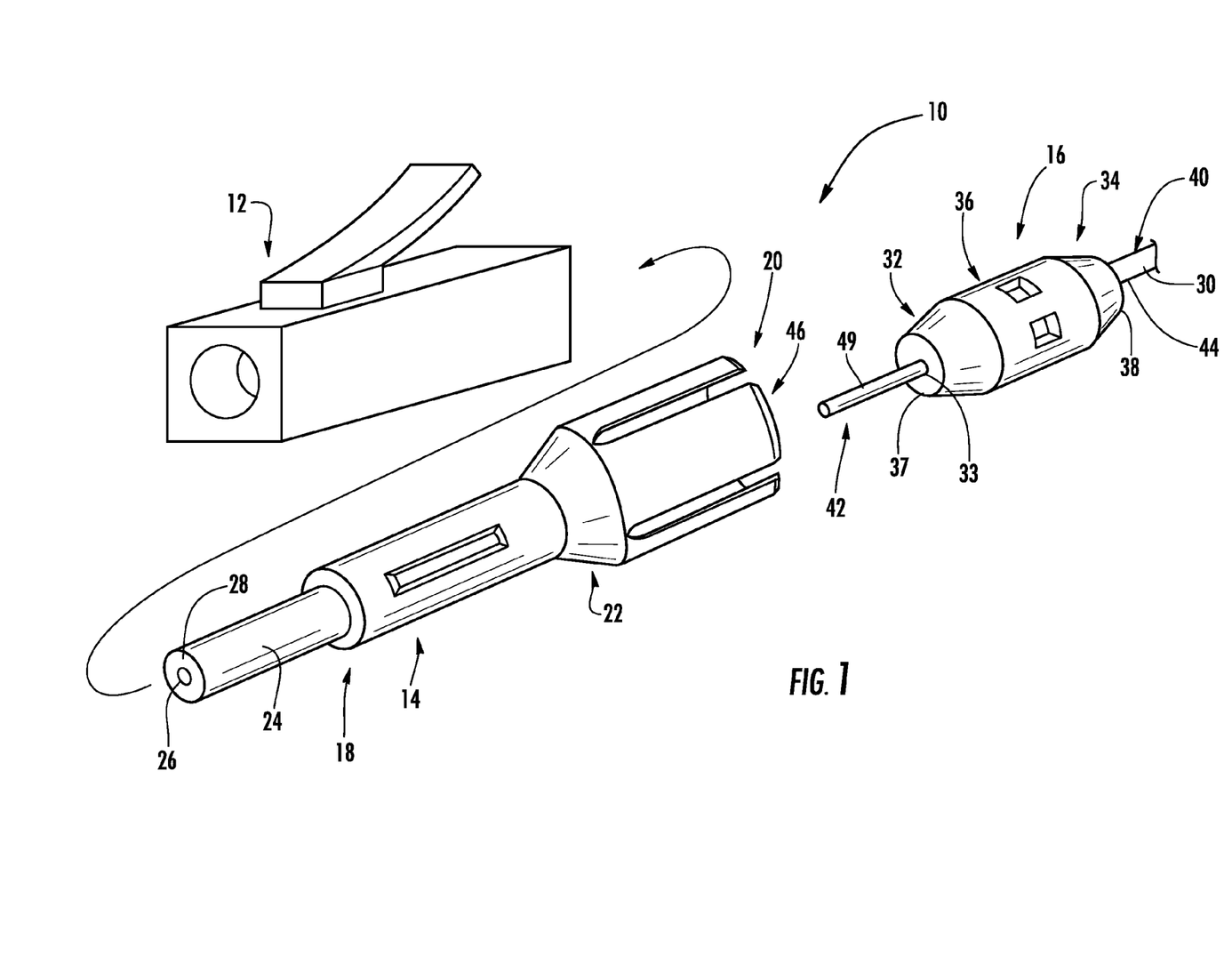
FIG. 1 is an exploded, perspective view of an optical fiber mechanical splice connector system according to one or more embodiments shown and described herein.

Referring to FIG. 1, an optical fiber mechanical splice connector system 10 includes a connector body 14, a fiber carrying pellet 16 and an outer connector housing 12 (e.g., in the form of an LC-type connector housing) that receives the connector body 14. The connector body 14 includes a ferrule receiving portion 18, a pellet receiving portion 20 and a support portion 22 located between the ferrule receiving portion 18 and the pellet receiving portion 20. A ferrule 24 is received by the ferrule receiving portion 18. The ferrule 24 may be formed of a ceramic or ceramic-like material. By using material such as ceramic and encasing a stub fiber 26 within the ferrule 24, a robust connector is produced that can accurately mate, disconnect, and subsequently re-mate with adapters suitable for accepting ferrule connectors. Also, an exposed end of the stub fiber 26 at a ferrule end 28 of the ferrule 24 may be factory cleaved and polished to provide excellent optical connectivity properties that cannot be easily achieved with tools used in the field. A protective dust cap (not shown) may be provided to protect the polished end of the stub fiber 26 from damage prior to installation.

The fiber carrying pellet 16 includes an insertion portion 32, a force receiving portion 34 and an intermediate handler connecting portion 36 that extends between the insertion portion 32 and the force receiving portion 34. As shown, both of the insertion portion 32 and the force receiving portion 34 may have a tapered contour (e.g., frustoconical in shape) where ends 37 and 38 of the insertion portion 32 and the force receiving portion 34, respectively, are of reduced width or diameter compared to the width or diameter of the intermediate handler connecting portion 36. The intermediate handler connecting portion 36 may be substantially cylindrical over at least a portion of its length. Other shapes for the insertion portion 32, force receiving portion 34 and intermediate handler connecting portion 36 are possible.

The fiber carrying pellet 16 is connected to and carries a field fiber 30 within a fiber receiving bore 33 of the fiber carrying pellet 16. In some embodiments, the field fiber 30 may include a sheathed portion 40 at the force receiving portion 34 and a stripped portion 42 at the insertion portion 32 where cladding 44 is removed from a core 49 of the field fiber 30. As will be described in greater detail below, the fiber carrying pellet 16 may be connected to the pellet receiving portion 20 of the connector body 14 by inserting the fiber carrying pellet 16 into a pellet receiving cavity 46 of the connector body 14, which optically couples the field fiber 30 to the stub fiber 26.

Figure 2:
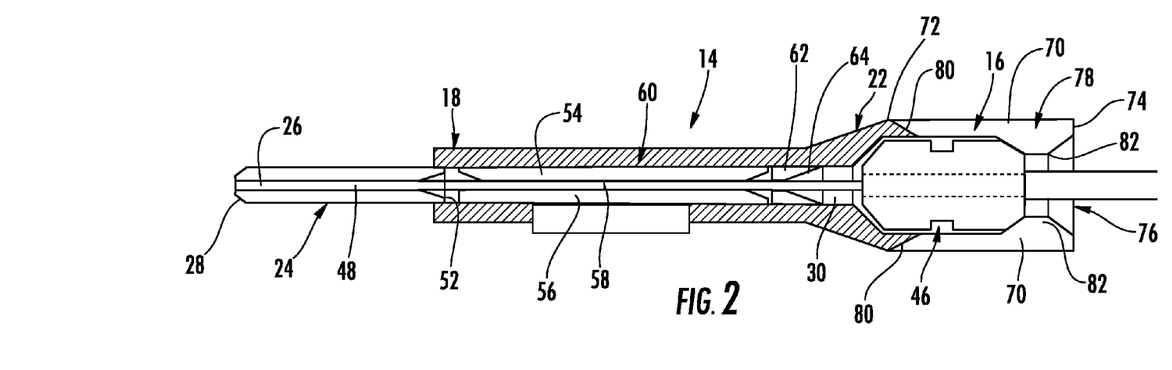
FIG. 2 is a section view of a connector body with fiber carrying pellet connected therewith according to one or more embodiments shown and described herein.

Referring now to FIG. 2, the fiber carrying pellet 16 is illustrated as received within the pellet receiving cavity 46 and the ferrule 24 is illustrated as received by the ferrule receiving portion 18 of the connector body 14. The ferrule 24 defines a lengthwise, longitudinal bore 48 for receiving and securing the stub fiber 26, such as using adhesive. An ferrule end 28 of the ferrule 24 may be precision polished such that the stub fiber 26 is flush with or slightly protrudes from the ferrule end 28. In other embodiments, the stub fiber 26 may protrude outwardly from the ferrule end 28 a predetermined distance. Furthermore, the ferrule end 28 may be oriented generally perpendicular to the bore to provide an Ultra Physical Contact (UPC) type connector, or may be formed at a predetermined angle to provide an Angled Physical Contact (APC) type connector. In addition, although a single fiber ferrule 24 is shown for purposes of convenience, the ferrule 24 may define a plurality of lengthwise bores therethrough for receiving a corresponding plurality of stub optical fibers to provide a multi-fiber mechanical splice connector.

A rear face 52 of the ferrule 24 is inserted into and secured within the ferrule receiving portion 18 of the connector body 14 so that the stub optical fiber 26 extends rearwardly a predetermined distance from the ferrule between a pair of opposed splice components 54 and 56 disposed within the connector body 14. In turn, the connector body 14, including the ferrule 24 and splice components 54 and 56, may be disposed within the outer connector housing 12 (FIG. 1). The stub fiber 26 has an internal end 58 that terminates within a longitudinally extending cavity 66 of the connector body 14. In the illustrated embodiment, the stub fiber 26 terminates within an alignment mechanism 60 in the form of a camming mechanism that includes the pair of opposed splice components 54 and 56. Other alignment mechanisms may be employed. The alignment mechanism 60 may be any suitable mechanism that aligns the field fiber 30 and the stub fiber 26 and maintains their aligned positions. A lead-in component 62 may also be provided. The lead-in component 62 may include a tapering bore 64 for guiding the field fiber 30 into the alignment mechanism 60.

Figure 3:
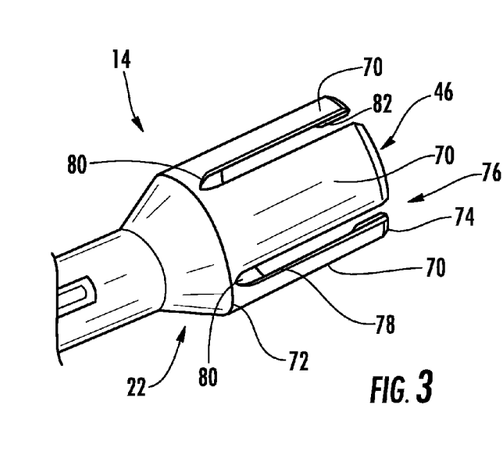
FIG. 3 is a partial, perspective view of the connector body of FIG. 2.

As indicated above, the fiber carrying pellet 16 is illustrated as received within the pellet receiving cavity 46. Referring also to FIG. 3, multiple engagement fingers 70 are located about a periphery of the pellet receiving cavity 46. The multiple engagement fingers 70 are connected at their forward ends 72 to the support portion 22 and extend rearward or away from the ferrule receiving portion 18 to free ends 74 located adjacent a pellet receiving opening 76. Each engagement finger 70 is spaced circumferentially from an adjacent engagement finger 70 forming an open-ended slot 78 therebetween. The slots 78 extend longitudinally along the lengths of the engagement fingers 70, terminating at arm disengagement structures 80 (e.g., ramp-shaped surfaces) connected to the support portion 22.

Referring to FIG. 2, the engagement fingers 70 include a force applying projection 82 that extends into the pellet receiving opening 76. The force applying projections 82 are located to engage the force receiving portion 34 and to apply a retention force to the fiber carrying pellet 16 once the fiber carrying pellet 16 is received within the pellet receiving cavity 46. This retention force applying operation will be described in greater detail below.

Figure 4:
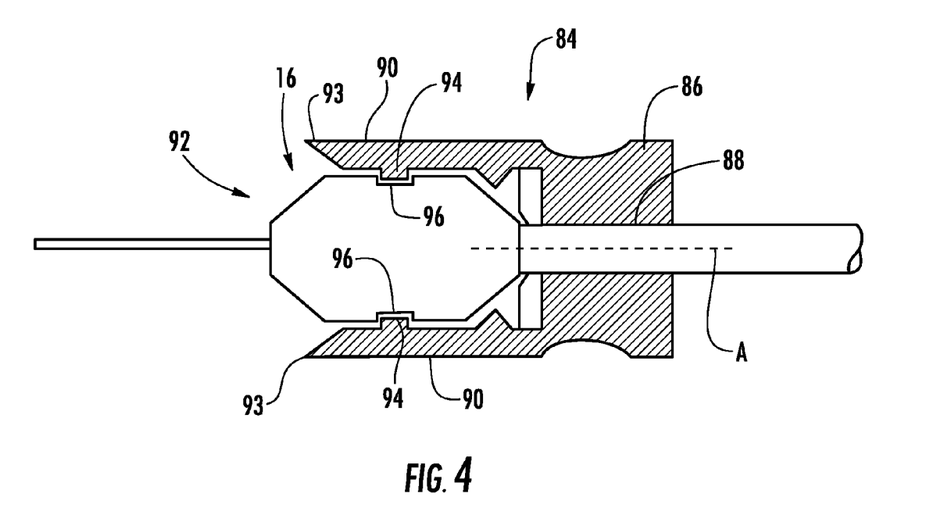
FIG. 4 is a section view of a pellet handler for handling the fiber carrying pellet of FIG. 2 according to one or more embodiments shown and described herein.
Figure 5:
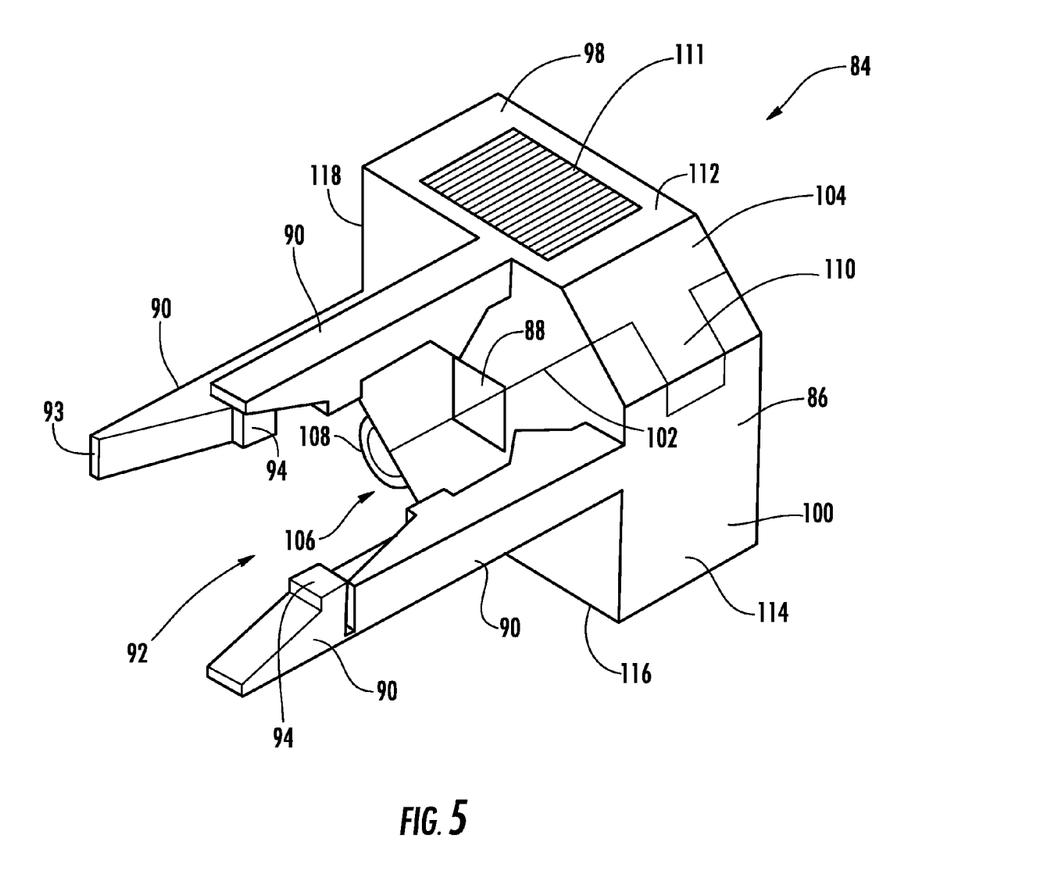
FIG. 5 is a perspective view of the pellet handler of FIG. 4 in isolation according to one or more embodiments shown and described herein.

Referring now to FIGS. 4 and 5, the fiber carrying pellet 16 may be handled manually using a pellet handler 84. The pellet handler 84 includes a handler body 86 with a fiber receiving opening 88 extending therethrough that defines an opening axis A. The fiber receiving opening 88 is illustrated as being square-shaped, however, any other suitable shape may be used. Multiple pellet engaging arms 90 extend outwardly from the handler body 86 in the direction of the opening axis A thereby defining a pellet receiving pocket 92 between the pellet engaging arms 90. Each pellet engaging arm 90 is cantilevered to the handler body 86 and extends to a free end 93. A connecting structure 94 (e.g., a projection) extends into the pellet receiving pocket 92 and is sized and shaped (e.g., square, rounded, triangular) to be received by cooperating connecting structure 96 (e.g., a notch) carried by the fiber carrying pellet 16 (FIG. 4). In the embodiment of FIG. 4, the pellet engaging arms 90 carry the connecting structures 94 in the form of projections and the fiber carrying pellet 16 carries the connecting structures 96 in the form of notches. In other embodiments, the fiber carrying pellet 16 may carry projections and the pellet engaging arms 90 may carry notches.

As can be best seen from FIG. 5, the multiple pellet engaging arms 90 include four pellet engaging arms 90 with each pellet engaging arm 90 spaced about 90 degrees from an adjacent pellet engaging arm 90. The pellet engaging arms 90 are also rotated 90 degrees from their adjacent pellet engaging arms 90 such that their connecting structures 94 face the opening axis A.

The handler body 86 may be divided into a first body portion 98 and a second body portion 100. The first and second body portions 98 and 100 may be separable from each other along an interface 102. In the illustrated embodiment, the interface 102 extends between corner portions 104 and 106 and intersects the fiber receiving opening 88. The first and second body portions 98 and 100 may remain movably connected together, even when separated, by a hinge 108 located at the corner portion 106. In other embodiments, the first and second body portions 98 and 100 may not be connected by a hinge. A latch 110 may be provided at the corner portion 104 for releasably securing the first and second body portions 98 and 100 together. In embodiments without a hinge, multiple latches may be provided for locking the first and second body portions 98 and 100 together. A grip feature 111 may be provided at one or more of the sides 112, 114, 116 and 118 of the handler body 86. The grip feature 111 may provide a region of increased friction for use in gripping and holding the pellet handler 84.

Figure 6:
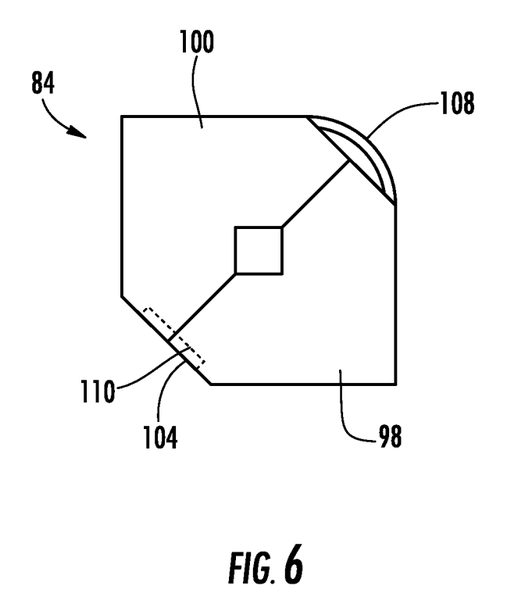
FIG. 6 is a rear view of the pellet handler of FIG. 5 in a closed configuration.
Figure 7:
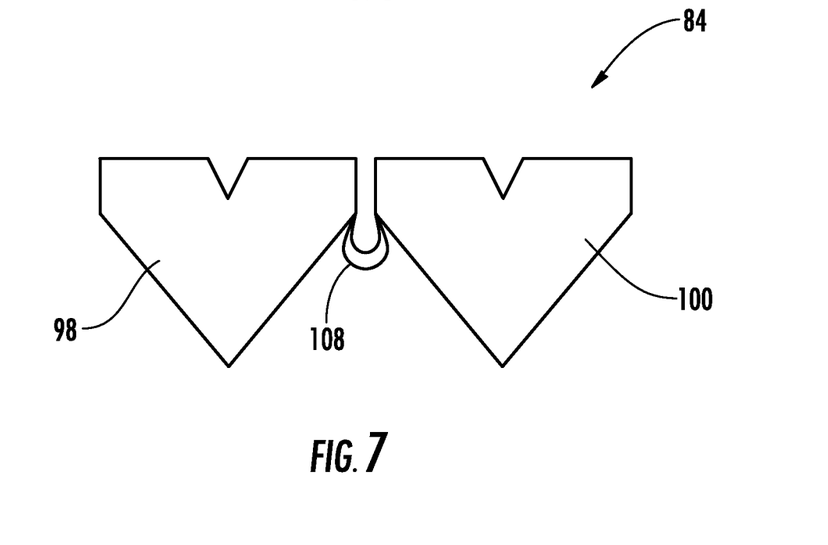
FIG. 7 is a rear view of the pellet handler of FIG. 5 in an open, pellet receiving configuration.

Referring briefly to FIGS. 6 and 7, the fiber carrying pellet 16 may be connected or received by the pellet handler 84 by first unlatching the latch 110 provided at the corner portion 104 and separating the first and second body portions 98 and 100. FIG. 7 illustrates the pellet handler 84 in an open, pellet receiving configuration with the first and second body portions 98 and 100 separated from each at their interface 102. As can be seen, the first and second body portions 98 and 100 may swing around the hinge 108 relative to each other. In this pellet receiving configuration, the fiber carrying pellet 16, already carrying the field fiber 30, may be placed between the pellet engaging arms 90 of one of the first and second body portions 98 and 100 such that the projections 94 of the pellet engaging arms 90 are received within the notches 96 formed in the intermediate handler connecting portion 36 of the fiber carrying pellet 16 and the field fiber 30 is received within the fiber receiving opening 88. The first and second body portions 98 and 100 may then be brought together and then latched capturing the fiber carrying pellet 16 within the pellet receiving pocket 92 and the field fiber 30 within the fiber receiving opening 88.

In the illustrated embodiment, the fiber receiving opening 88 is square in shape and may have a width and/or height that is slightly less than the outer diameter of the field fiber 30. Such an arrangement can capture the field fiber 30 and grip the field fiber 30 within the fiber receiving opening 88. This gripping of the field fiber 30 within the fiber receiving opening 88 can improve the holding force on the field fiber 30 as compared to only the fiber carrying pellet 16 gripping the field fiber 30, which can facilitate stripping and cleaving operations performed on the field fiber 30 prior to connecting the fiber carrying pellet 16 to the connector body 14.

Figure 8:
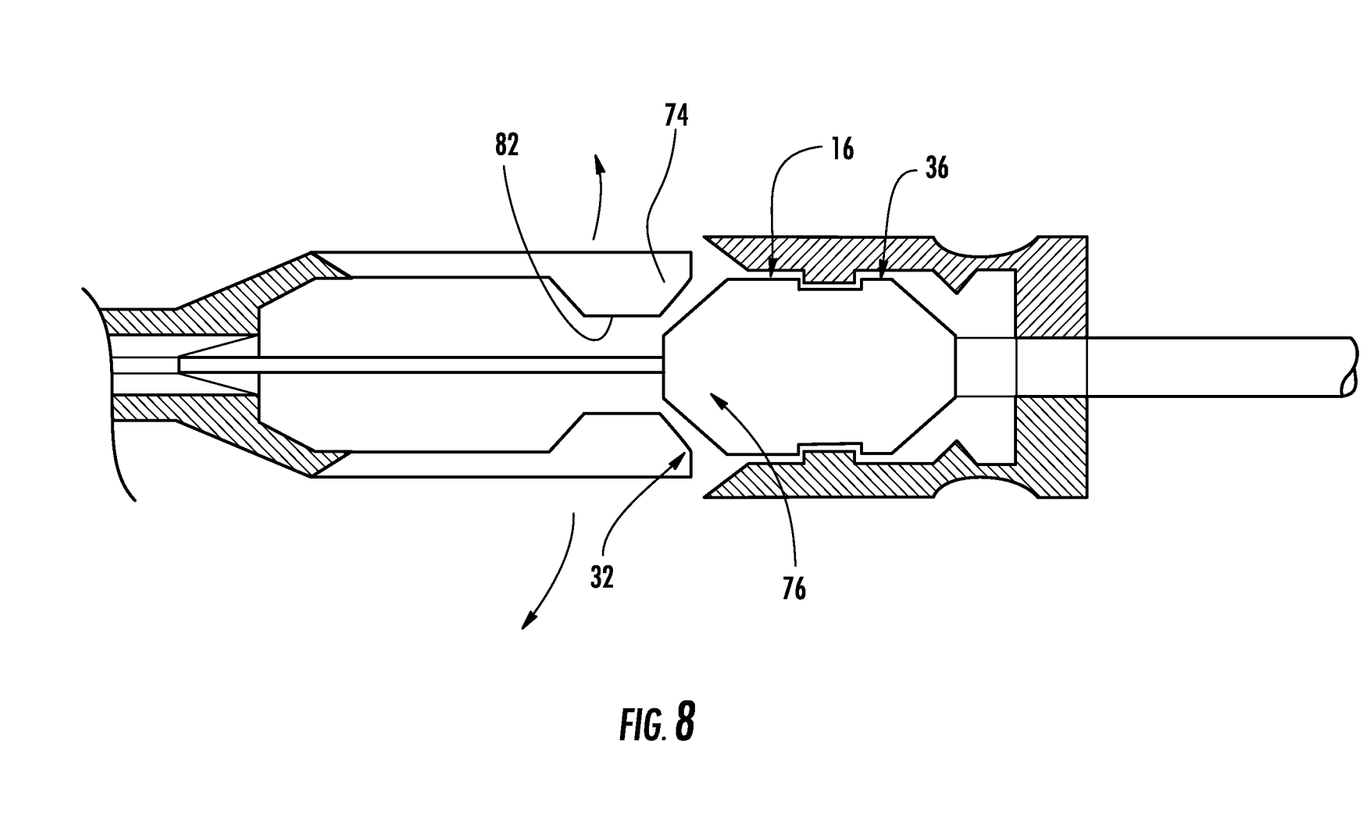
FIG. 8 is a side, section view illustrating a method of optically coupling a field fiber to a stub fiber using an optical fiber mechanical splice connector according to one or more embodiments shown and described herein.

The pellet handler 84 may then be used to manipulate the fiber carrying pellet 16 and to insert the fiber carrying pellet 16 and the field fiber 30 into the pellet receiving cavity 46 of the connector body 14. Referring to FIG. 8, the insertion portion 32 of the fiber carrying pellet 16 is inserted through the pellet receiving opening 76. As the fiber carrying pellet 16 is received in the pellet receiving opening 76, the pellet engaging arms 90 are aligned with and are dimensioned to be received within the open-ended slots 78 between adjacent engagement fingers 70. The slots 78 provide a passageway for the pellet engaging arms 90 to travel as the fiber carrying pellet 16 is inserted into the pellet receiving cavity 46. The slots 78 and engagement fingers 70 may also provide alignment tracks that spatially align the fiber carrying pellet 16 within the pellet receiving cavity 46 as the fiber carrying pellet 16 is being inserted into the pellet receiving cavity 46.

The fiber carrying pellet 16 is inserted through the pellet receiving opening 76, the insertion portion 32 contacts the force applying projections 82 that extend into the pellet receiving opening 76. The tapered or conical shape of the insertion portion 32 causes the free ends 74 of the engagement fingers 70 to resiliently deflect outwardly thereby increasing the size of the pellet receiving opening 76 to accommodate the larger diameter intermediate handler connecting portion 36 of the fiber carrying pellet 16.

Figure 9:
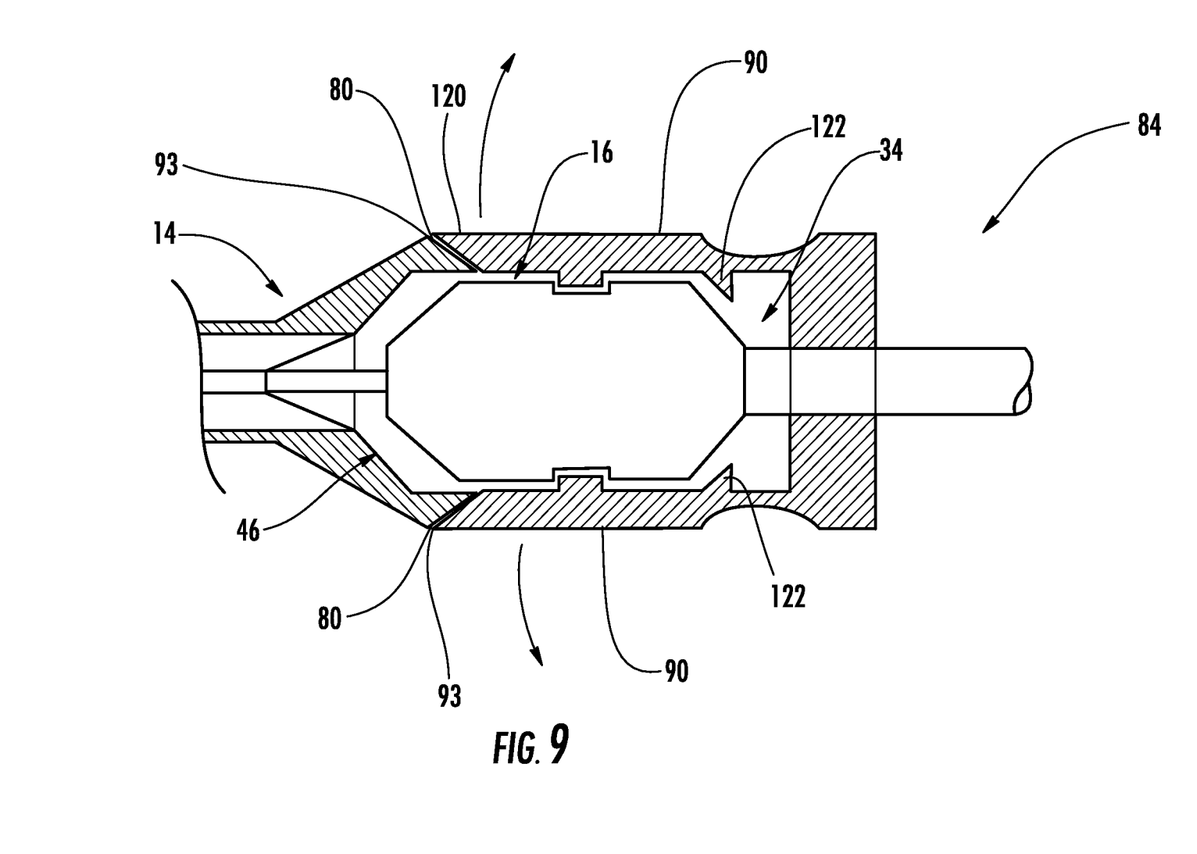
FIG. 9 is a side, section view illustrating a method of optically coupling a field fiber to a stub fiber using an optical fiber mechanical splice connector according to one or more embodiments shown and described herein.

Referring to FIG. 9, the force applying projections 82 follow along the outer contour of the fiber carrying pellet 16 to the force receiving portion 34. As, before or after the force applying projections 82 contact the force receiving portion 34, the free ends 93 of the pellet engaging arms 90 engage the arm disengagement structures 80 in the form of ramp-shaped surfaces. The pellet engaging arms 90 also include arm disengagement structures 120 in the form of ramp-shaped surfaces. When the disengagement structures 80 and 120 engage, the pellet engaging arms 90 resiliently deflect away from the fiber carrying pellet 16 to release the fiber carrying pellet 16 as it is inserted into the pellet receiving cavity 46. The pellet engaging arms 90 may further include push structures 122 that continue to engage the fiber carrying pellet 16, even after the pellet engaging arms 90 have released the fiber carrying pellet 16. The push structures 122 allow the operator to continue to push the fiber carrying pellet 16 into the pellet receiving cavity 46 after the pellet engagement arms 90 release the fiber carrying pellet 16.

Figure 10:
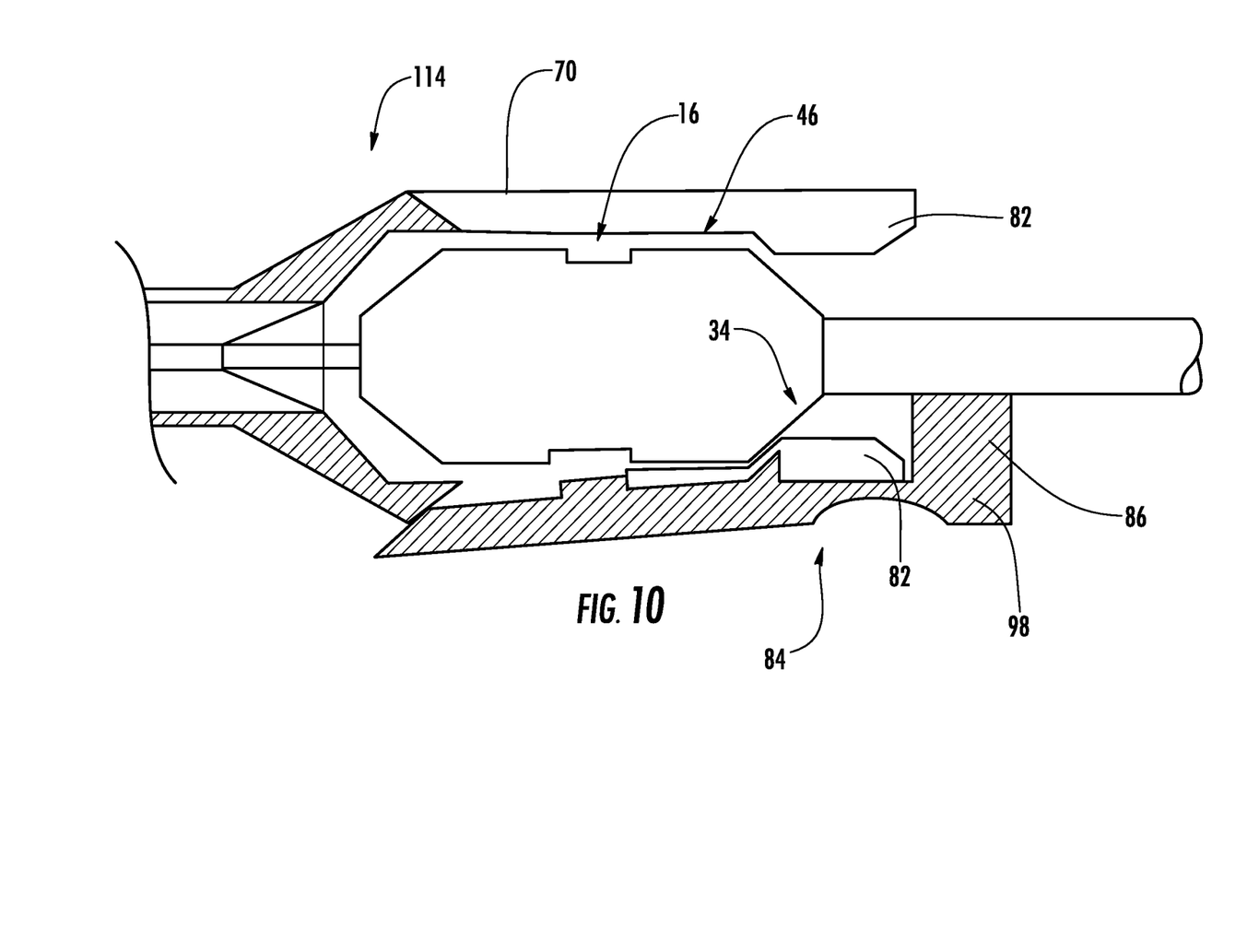
FIG. 10 is a side, section view illustrating a method of optically coupling a field fiber to a stub fiber using an optical fiber mechanical splice connector according to one or more embodiments shown and described herein.

Referring to FIG. 10, the handler body 86 may then be opened by separating the first and second body portions 98 and 100 as discussed above and removed from the connector body 14 with the fiber carrying pellet 16 remaining inside the pellet receiving cavity 46.

Once the fiber carrying pellet 16 is located within the pellet receiving cavity 46, the engagement fingers 70 remain deflected due to engagement between the force applying projections 82 and the force receiving portion 34 of the fiber carrying pellet 16. The engagement fingers 70 act as a cantilever spring, applying a retention force at the force receiving portion 34 that biases the fiber carrying pellet 16 toward the ferrule receiving portion 18 of the connector body 14.

Figures 11, 12:
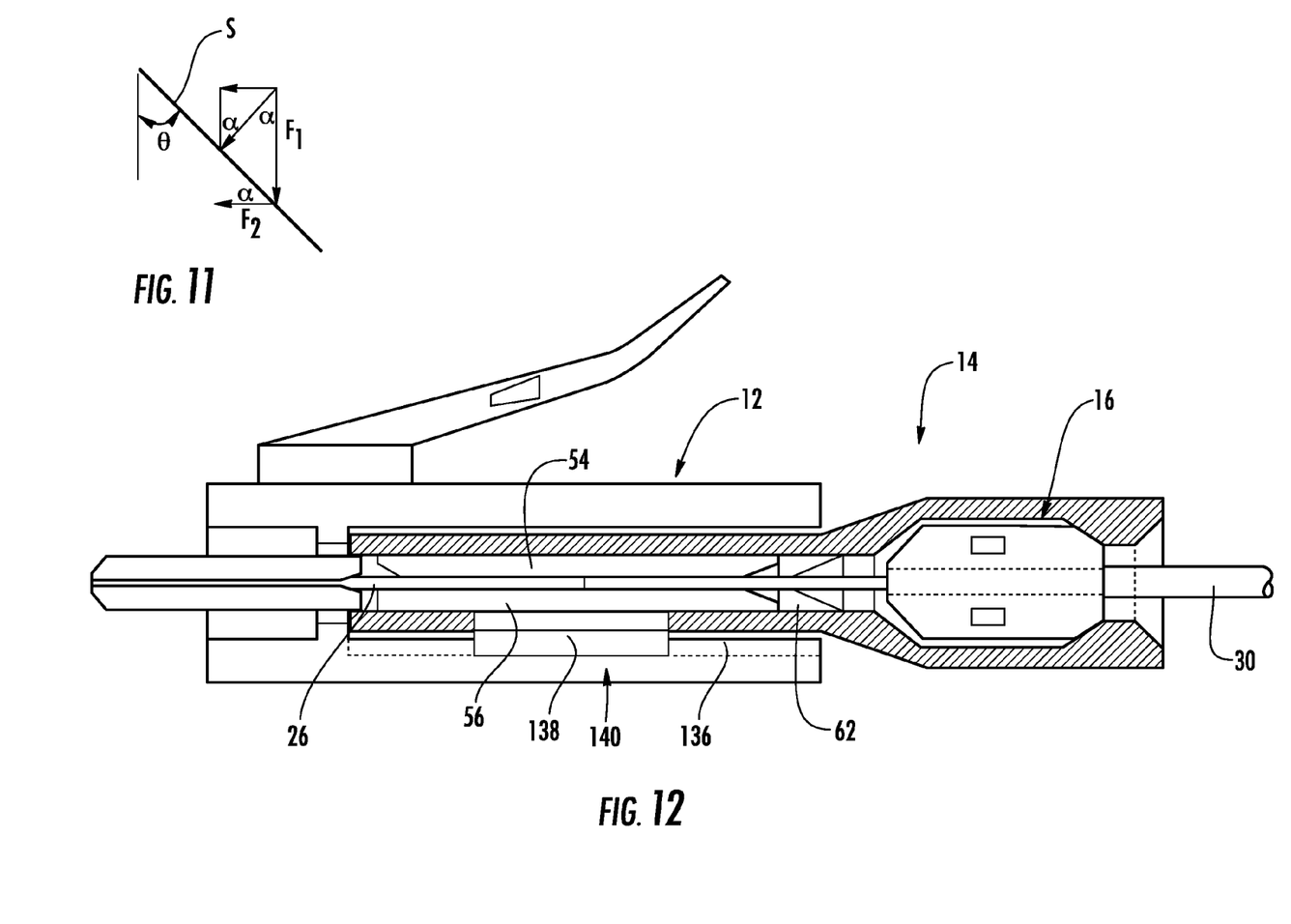
FIG. 11 is a diagram of the cantilever force $F_1$ applied by engagement fingers of the connector body of FIG. 2 and the resultant retention force $F_2$.
FIG. 12 is a side, section view of the optical fiber mechanical splice connector system of FIG. 1 in an assembled configuration.

Referring to FIG. 11, a diagram of the cantilever force $F_1$ applied by the engagement fingers 70 and the resultant retention force $F_2$ is illustrated. As illustrated, the surface S of the force receiving portion 34 is at about a 45 degree angle $\theta$ to the vertical. Other angles $\theta$ may be used such as between about 15 degrees and about 75 degrees. The substantially vertical cantilever force $F_1$ can be provided such that the axial retention force $F_2$ urges the field fiber 30 into contact with the stub fiber 26 with the appropriate contact pressure. In some embodiments, it may be desired that one or both of the field fiber 30 and the stub fiber 26 buckle under the contact pressure. In these embodiments, the contact pressure may be between about 0.5 Newton and about one Newton. In other embodiments, the contact pressure may be such that the field fiber 30 and/or the stub fiber 26 do not buckle. In these embodiments, the contact pressure may be between about 0.1 Newton and about 0.5 Newton.

Referring now to FIG. 12, the connector body 14 with the fiber carrying pellet 16 may be positioned within the outer connector housing 12. The conical lead-in component 62 guides the field fiber 30 from the fiber carrying pellet 16 to between the splice components 54 and 56. In some embodiments, one or both of the splice components 54 and 56 may include a groove formed therein for receiving the stub fiber 26 and the field fiber 30 and for guiding the fibers 26 and 30 into fine alignment. The camming mechanism including the splice components 54 and 56 may be actuated by rotating the connector body 14 with the fiber carrying pellet 16 about the longitudinal axis of the connector body 14. The internal geometry 136 of the connector housing 12 is shaped to engage a splice keel 138 that is connected or protrudes outwardly from the splice component 56. As the connector body is rotated, engagement between the internal geometry 136 and the splice keel 138 forces the splice component 56 toward the splice component 54, as illustrated by arrow 140. Movement of the splice component 56 may cause the end portions of the stub fiber 26 and the field fiber 30 to seat within a V-shaped groove, for example, in the splice component 56, thereby simultaneously aligning and securing the field fiber 30 relative to the stub fiber 26.

If the continuity of the optical coupling between the field optical fiber 30 and the stub optical fiber 26 is acceptable (e.g., the insertion loss is less than a prescribed value and/or the reflectance is greater than a prescribed value), the cable assembly can be completed. In the event that the field optical fiber 30 is not in physical contact or is not properly aligned with the stub optical fiber 26, significant attenuation and/or reflectance of the optical signal transmitted along the optical fibers may occur. A slight amount of attenuation and/or reflectance is inevitable at any optical coupling due to the fact that the cores of the optical fibers are not truly concentric and the joint between the optical fibers cannot be formed with the same precision as a continuous optical fiber. Accordingly, the continuity of the optical coupling between the field optical fiber 30 and the stub optical fiber 26 is acceptable when a variable related to the optical performance of the connector, such as insertion loss or reflectance, is within a prescribed limit or meets a predetermined threshold value. In a particular example, the continuity of the optical coupling is sufficient, and therefore the splice termination is acceptable, when the insertion loss at the mechanical splice is less than a prescribed value and/or the reflectance at the mechanical splice is greater than a prescribed value.

Figure 13:
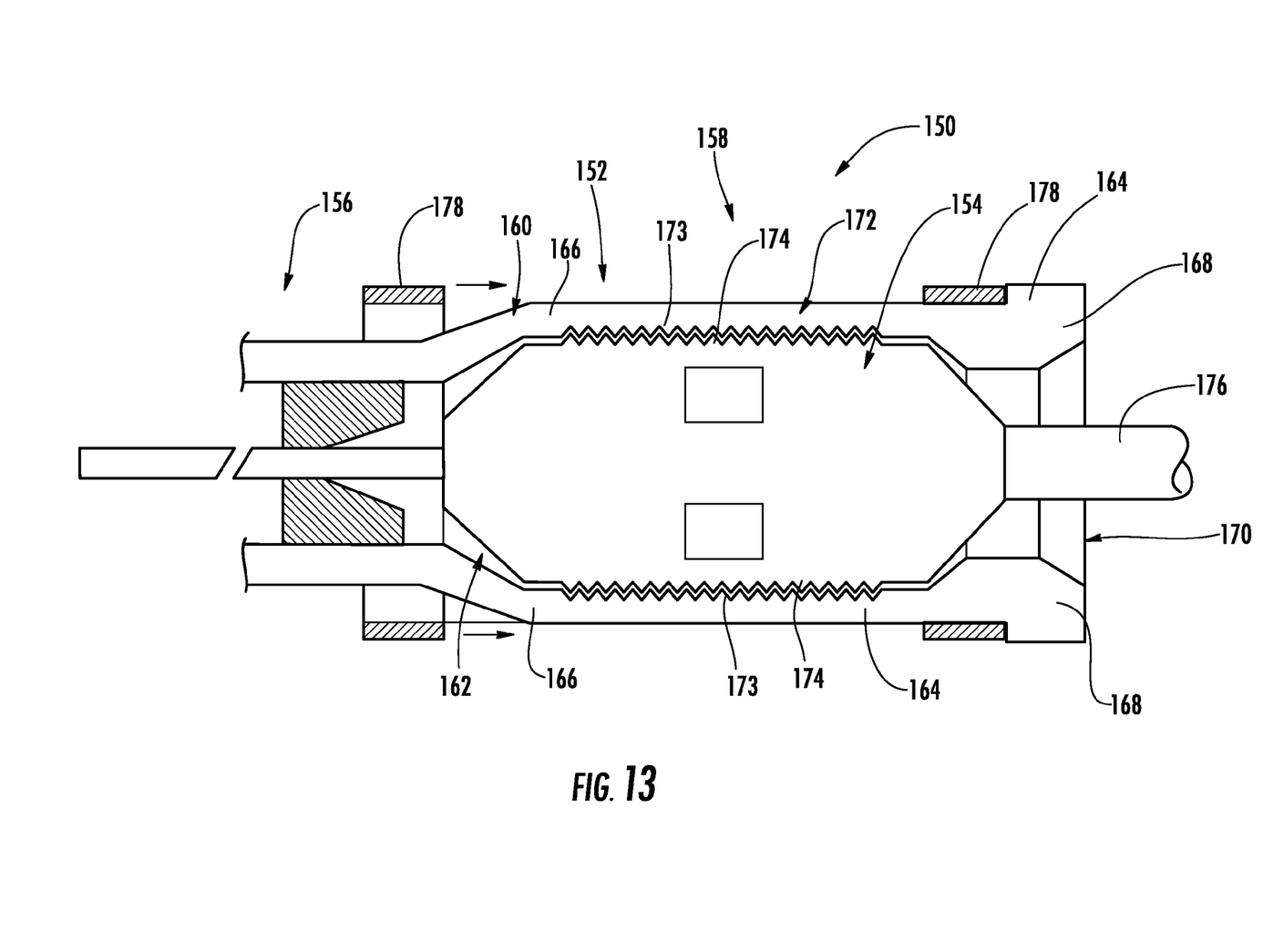
FIG. 13 is partial, section view of another embodiment of a connector body and fiber carrying pellet.

Referring to FIG. 13, another embodiment of an optical fiber mechanical splice connector system 150 includes a connector body 152 and a fiber carrying pellet 154. Similar to the connector body described above, the connector body 152 may be received by an outer connector housing (e.g., in the form of an LC-type connector housing). The connector body 152 includes a ferrule receiving portion 156, a pellet receiving portion 158 and a support portion 160 located between the ferrule receiving portion 156 and the pellet receiving portion 158. A ferrule (not shown) is received by the ferrule receiving portion in a fashion similar to that described above.

The fiber carrying pellet 154 is illustrated as received within a pellet receiving cavity 162. Multiple engagement fingers 164 are located about a periphery of the pellet receiving cavity 162. The multiple engagement fingers 164 are connected at their forward ends 166 to the support portion 160 and extend rearward or away from the ferrule receiving portion 156 to free ends 168 located adjacent a pellet receiving opening 170. Each engagement finger 164 is spaced circumferentially from an adjacent engagement finger 164 forming open-ended slots 172 similar to those depicted in FIG. 3. The slots 172 extend longitudinally along the lengths of the engagement fingers 164, terminating at arm disengagement structures (e.g., ramp-shaped surfaces) connected to the support portion 160.

The engagement fingers 164 include interlocking structures in the form of teeth 173. The teeth 173 of the engagement fingers 164 interlock with interlocking structures in the form of teeth 174 carried by the fiber carrying pellet 154. When inserting the fiber carrying pellet 154 into the cavity of the pellet receiving portion 158 (e.g., using the pellet handler 84), the engagement fingers 164 deflect allowing the teeth 173 of the engagement fingers 164 to slide by the teeth 174 of the fiber carrying pellet 154. Once the field fiber 176 engages the stub fiber (not shown), the engagement fingers 164 may be placed in a locked position where the teeth 173 of the engagement fingers 164 are engaged with the teeth 174 of the fiber carrying pellet 154. A locking sleeve 178 may be moved from an open position to a locked position to inhibit deflection of the engagement fingers 164.

The above-described connector bodies, fiber carrying pellets and pellet handlers may be formed of any suitable material, such as engineering thermoplastics, metals and combinations thereof. Any suitable processes may be used, such as molding, casting and/or machining.

The above-described optical fiber connectors may be field-installable and can be coupled onto an end portion of an optical fiber in the field. These connectors create a physical mating between the ends of mating optical fibers. The field fiber may be carried by a fiber carrying pellet that can be received within a pellet receiving portion of a connector body. A pellet handler may be provided to manipulate the fiber carrying pellet, which can improve handling of the field fiber and improve field processing of the field fiber, such as stripping the field fiber prior to its engagement with the stub fiber.

It will be apparent to those skilled in the art that various modifications and variations can be made to the embodiments described herein without departing from the spirit and scope of the claimed subject matter. Thus, it is intended that the specification cover the modifications and variations of the various embodiments described herein, provided such modification and variations come within the scope of the appended claims and their equivalents.

What is claimed is:

1. An optical fiber mechanical splice connector system that couples with a field fiber, comprising:
    a connector body comprising a ferrule receiving portion, a pellet receiving portion and a support portion between the ferrule receiving portion and pellet receiving portion, the pellet receiving portion including one or more engagement fingers connected at a first end to the support portion and extending away from the ferrule receiving portion to a second, free end adjacent a pellet receiving opening of a pellet receiving cavity at the pellet receiving portion;
    a ferrule connected to the connector body at the ferrule receiving portion;
    a stub fiber captured within the ferrule, wherein the stub fiber extends from the ferrule into a fiber receiving cavity provided within the connector body for connecting with the field fiber; and
    a fiber carrying pellet that carries the field fiber, wherein inserting the fiber carrying pellet through the pellet receiving opening resiliently deflects the one or more engagement fingers thereby enlarging the pellet receiving opening such that the fiber carrying pellet is received by the pellet receiving cavity of the connector body.

2. The connector system of claim 1, wherein the fiber carrying pellet includes an insertion portion and a force receiving portion, the one or more engagement fingers including a force applying projection that extends into the pellet receiving opening and engages the force receiving portion of the fiber carrying pellet and applies a retention force to the fiber carrying pellet to urge the fiber carrying pellet in a direction toward the stub fiber.

3. The connector system of claim 1 comprising multiple engagement fingers located about a periphery of the pellet receiving cavity, the multiple engagement fingers connected at their first ends to the support portion and extending away from the ferrule receiving portion to second, free ends adjacent the pellet receiving opening.

4. The connector system of claim 3, wherein adjacent engagement fingers are separated by a slot that facilitates movement of one of the multiple adjacent engagement fingers relative to the other of the multiple engagement fingers.

5. The connector system of claim 1 further comprising a pellet handler that releasably engages the fiber carrying pellet and is used to insert the fiber carrying pellet into the pellet receiving cavity.

6. The connector system of claim 5, wherein the pellet handler includes
    a handler body with a fiber receiving opening extending therethrough defining an opening axis; and
    a pellet engaging arm extending outwardly from the handler body in a direction of the opening axis.

7. The connector system of claim 6, wherein the pellet engaging arm is slidably received within a slot adjacent the one or more engagement fingers as the fiber carrying pellet is inserted into the pellet receiving cavity.

8. The connector system of claim 7 comprising an arm disengagement structure located within the slot, the arm disengagement structure deflecting the pellet engaging arm in a direction away from the fiber carrying pellet to disengage the fiber carrying pellet.

9. The connector system of claim 8, wherein the pellet engaging arm includes a push feature that is used to move the fiber carrying pellet toward the stub fiber after the pellet engaging arm is deflected by the arm disengagement structure.

10. The connector system of claim 6, wherein the handler body includes a first body portion that is separable from a second body portion along an interface, the interface intersecting the fiber receiving opening.

11. An optical fiber mechanical splice connector system that couples with a field fiber, comprising:
   a connector body comprising a ferrule receiving portion, a pellet receiving portion and a support portion between the ferrule receiving portion and pellet receiving portion, the pellet receiving portion including one or more engagement fingers connected at a first end to the support portion and extending away from the ferrule receiving portion to a second, free end adjacent a pellet receiving opening of a pellet receiving cavity at the pellet receiving portion;
   a ferrule connected to the connector body at the ferrule receiving portion;
   a stub fiber captured within the ferrule, wherein the stub fiber extends from the ferrule into a fiber receiving cavity provided within the connector body for connecting with the field fiber;
   a fiber carrying pellet that carries the field fiber; and
   a pellet handler comprising a handler body with a fiber receiving opening extending therethrough defining an opening axis and a pellet engaging arm extending outwardly from the handler body in a direction of the opening axis, the pellet engaging arm including connecting structure that engages cooperating connecting structure carried by the fiber carrying pellet to releasably connect the fiber carrying pellet to the pellet handler.

12. The connector system of claim 11, wherein the fiber carrying pellet includes an insertion portion and a force receiving portion, the one or more engagement fingers including a force applying projection that extends into the pellet receiving opening and engages the force receiving portion of the fiber carrying pellet and applies a retention force to the fiber carrying pellet to urge the fiber carrying pellet in a direction toward the stub fiber with the fiber carrying pellet located in the pellet receiving cavity.

13. The connector system of claim 11 comprising multiple engagement fingers located about a periphery of the pellet receiving cavity, the multiple engagement fingers connected at their first ends to the support portion and extending away from the ferrule receiving portion to second, free ends adjacent the pellet receiving opening.

14. The connector system of claim 13, wherein adjacent engagement fingers are separated by a slot that facilitates movement of one of the multiple adjacent engagement fingers relative to the other of the multiple engagement fingers.

15. The connector system of claim 11, wherein the pellet engaging arm is slidably received within a slot adjacent the one or more engagement fingers as the fiber carrying pellet is inserted into the pellet receiving cavity.

* * * * *